(12) United States Patent
Shibazaki

(10) Patent No.: US 7,599,029 B2
(45) Date of Patent: Oct. 6, 2009

(54) LIQUID CRYSTAL DISPLAY DEVICE HAVING A PARALLEL ALIGNMENT TYPE LIQUID CRYSTAL LAYER

(75) Inventor: Minoru Shibazaki, Tokyo (JP)

(73) Assignee: TPO Hong Kong Holding Limited, Shatin (HK)

(*) Notice: Subject to any disclaimer, the term of this patent is extended or adjusted under 35 U.S.C. 154(b) by 32 days.

(21) Appl. No.: 11/587,600

(22) PCT Filed: May 20, 2005

(86) PCT No.: PCT/IB2005/051642

§ 371 (c)(1),
(2), (4) Date: Jun. 11, 2007

(87) PCT Pub. No.: WO2005/114312

PCT Pub. Date: Dec. 1, 2005

(65) Prior Publication Data

US 2007/0242200 A1    Oct. 18, 2007

(30) Foreign Application Priority Data

May 21, 2004 (JP) .............................. 2004-151275

(51) Int. Cl.
    G02F 1/1333 (2006.01)
(52) U.S. Cl. .................. 349/120; 349/117; 349/119
(58) Field of Classification Search .................. 349/120
    See application file for complete search history.

(56) References Cited

U.S. PATENT DOCUMENTS

2005/0057704 A1* 3/2005 Ootake et al. .................. 349/69

FOREIGN PATENT DOCUMENTS

| CN | 1448734 A | 10/2003 |
|----|-----------|---------|
| EP | 1 378 784 A1 | 1/2004 |
| WO | WO-03/093899 A1 | 11/2003 |
| WO | WO-2004/053580 A1 | 6/2004 |
| WO | WO-2004/102260 A1 | 11/2004 |
| WO | WO-2004/102262 A1 | 11/2004 |

OTHER PUBLICATIONS

Yeh, et al., Displays, Elsevier Science Publishers BV., Barking, GB, vol. 21, No. 1, Mar. 2000, pp. 31-38.

(Continued)

*Primary Examiner*—Frank G Font
*Assistant Examiner*—Erin D Chiem
(74) *Attorney, Agent, or Firm*—Birch, Stewart, Kolasch & Birch, LLP

(57) ABSTRACT

Transflective liquid crystal display device (100.200) comprising a set of polarisers and compensators sandwiching a liquid crystal layer (15) of parallel alignment type, designed for the purpose of improving the viewing angle characteristics of the device, in particular the dark state (voltage on-state) and the contrast. In the reflective part, the arrangement of optical elements consists of a polariser (11), a (biaxial or uniaxial) first retarder (12), a (biaxial of unaxial) second retarder (13), a negative uniaxial third retarder (14) and a liquid crystal cell (15) with well defined orientations of the respective optical axes to each other. In the transmissive part, the arrangement of retarders and polariser as arranged on the viewer side is repeated in reverse order on the backlight side of the liquid crystal device.

6 Claims, 7 Drawing Sheets

OTHER PUBLICATIONS

Yamahara et al., Japanese Journal of Applied Physics, Part 1, Japan Soc. Appl. Phys Japan, vol. 41, No. 10, Oct. 10, 2002, pp. 6072-6079.

Pochi Yeh et al., Proceedings of the SPIE, SPIE, Bellingham, VA, US, vol. 3421, Jul. 1998, pp. 224-235.

Shibazaki et al., Japanese Journal of Applied Physics, Publication Office Japanese Journal of Applied Physics, Tokyo, JP, vol. 40, No. 12B, part 2, Dec. 15, 2001, pp. L1373-L1376.

Hiroyuki et al., SID Digest, vol. XXXIII, 2002, pp. 862-865.

* cited by examiner

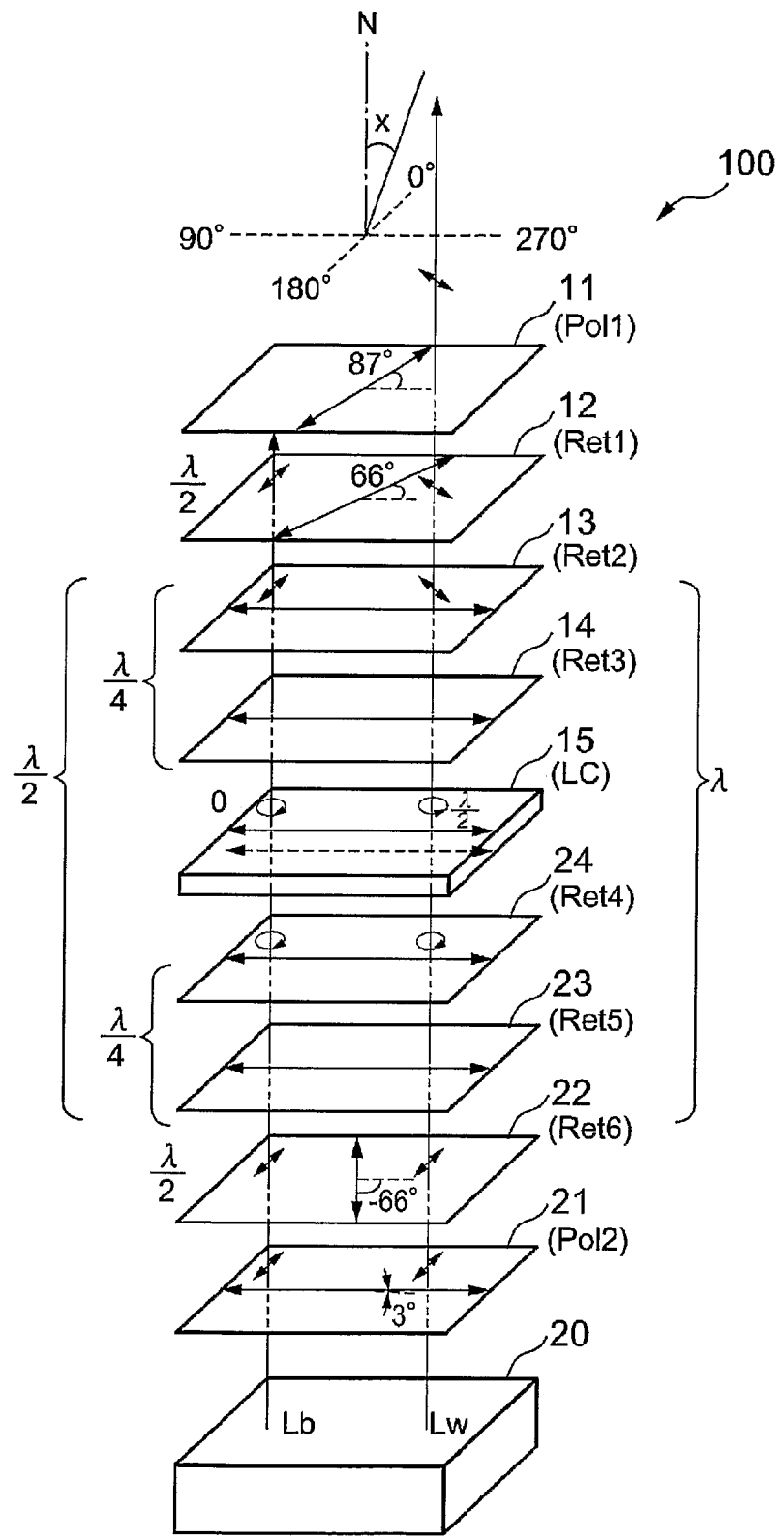
[Fig. 1]

[Fig. 2]
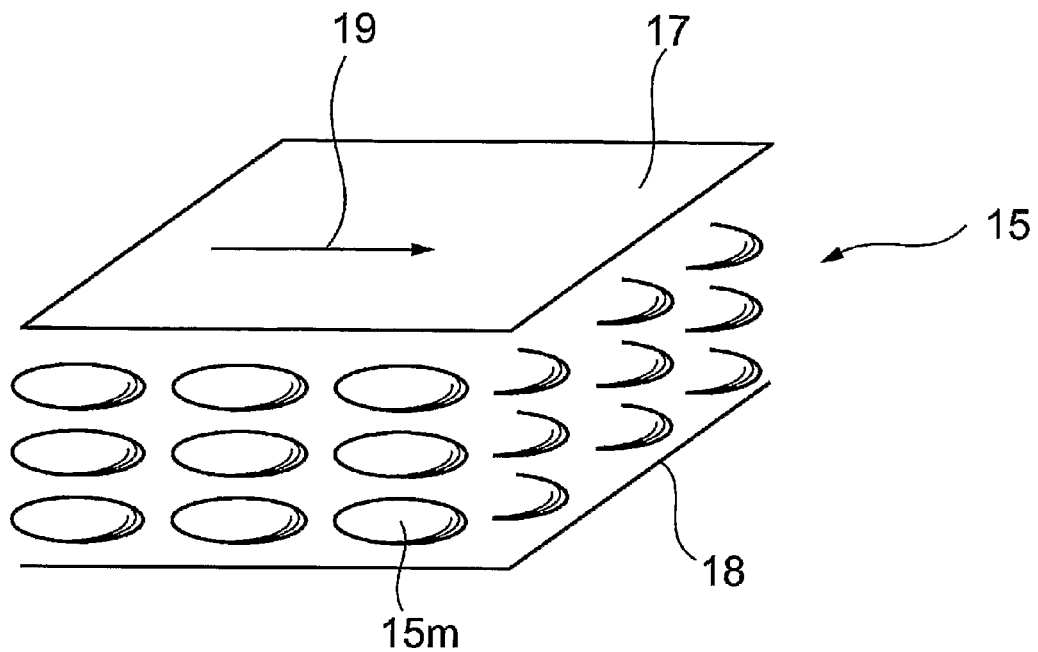
[Fig. 3]
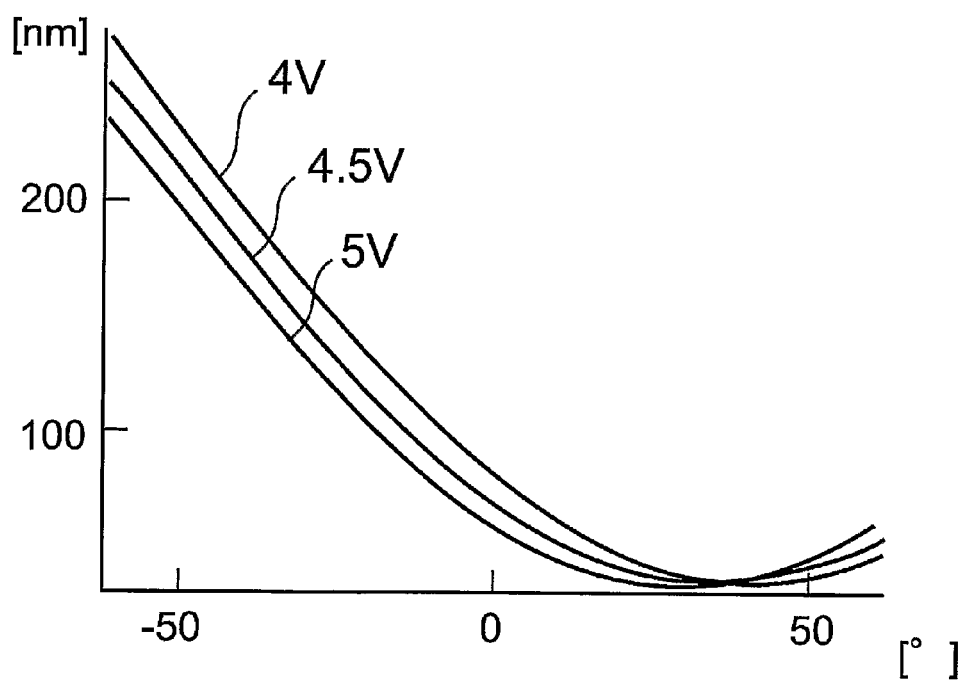

[Fig. 4]
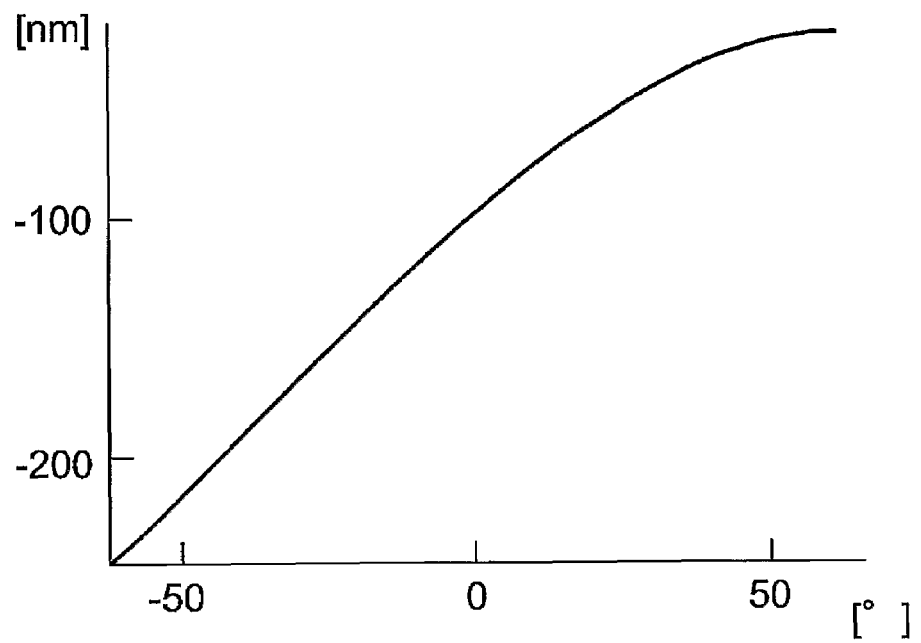
[Fig. 5]
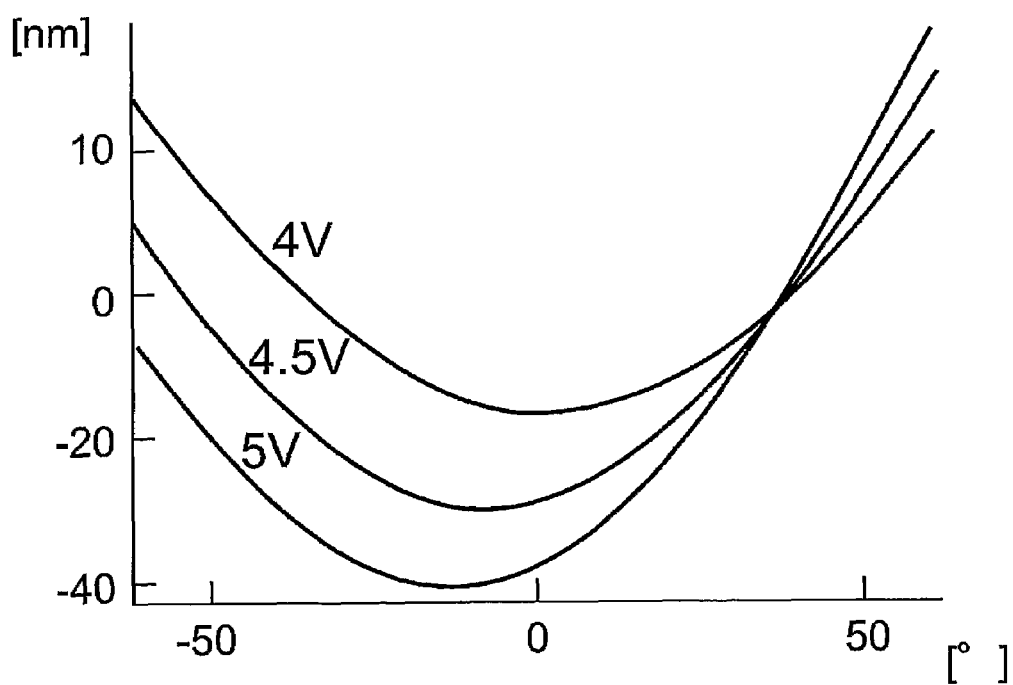

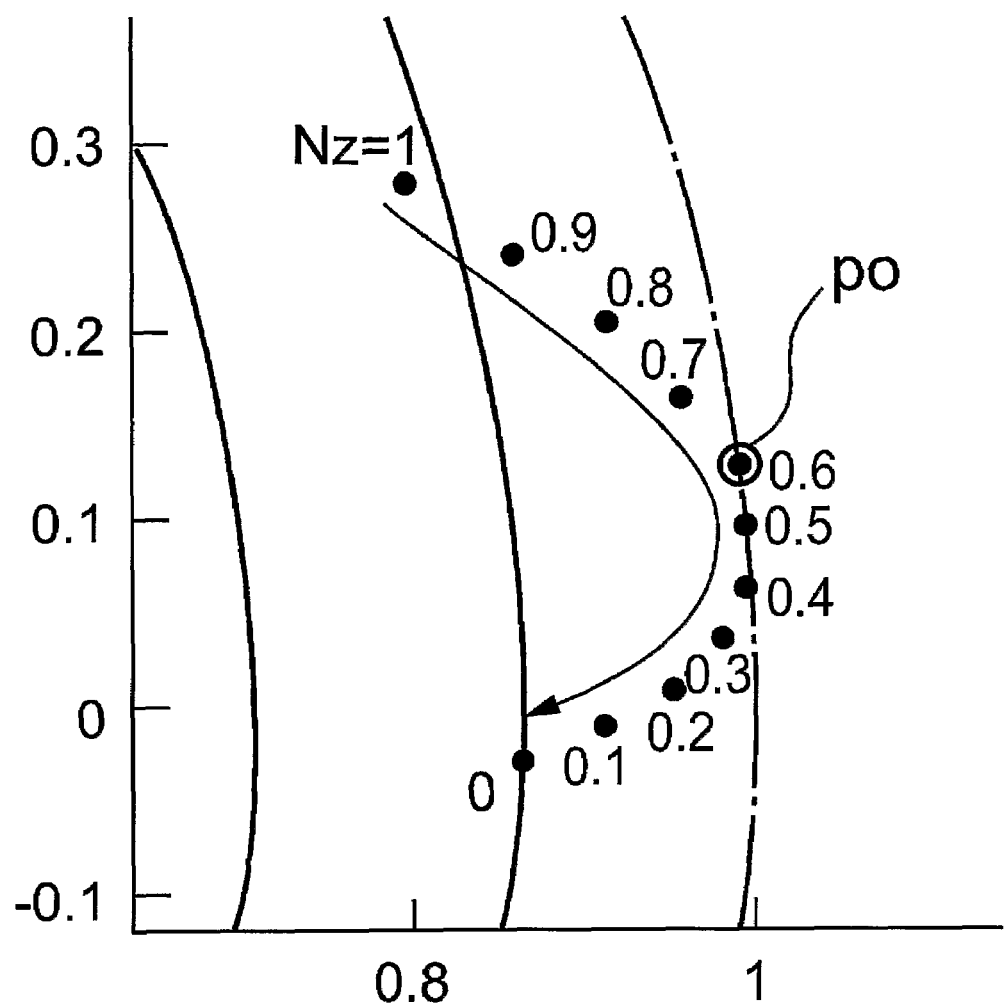
[Fig. 6]

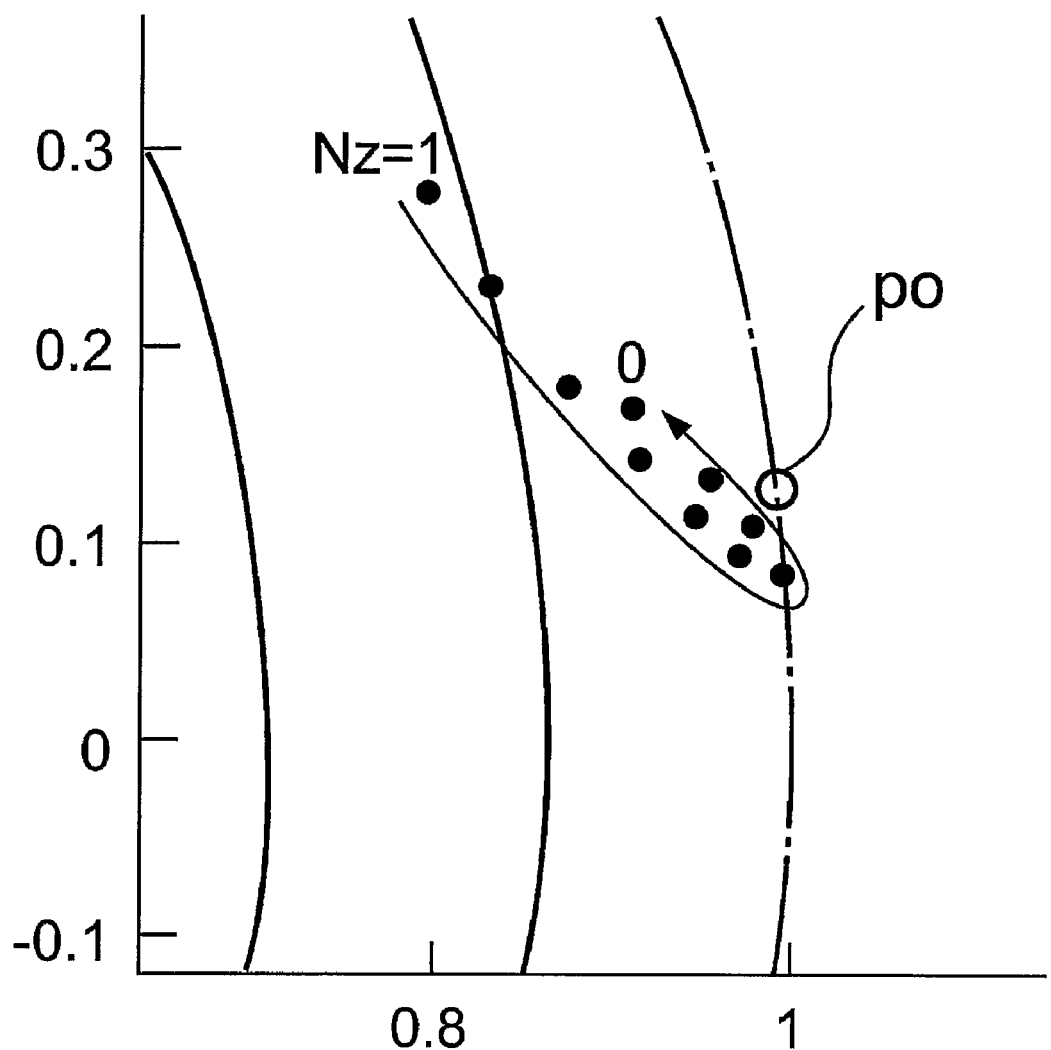
[Fig. 7]

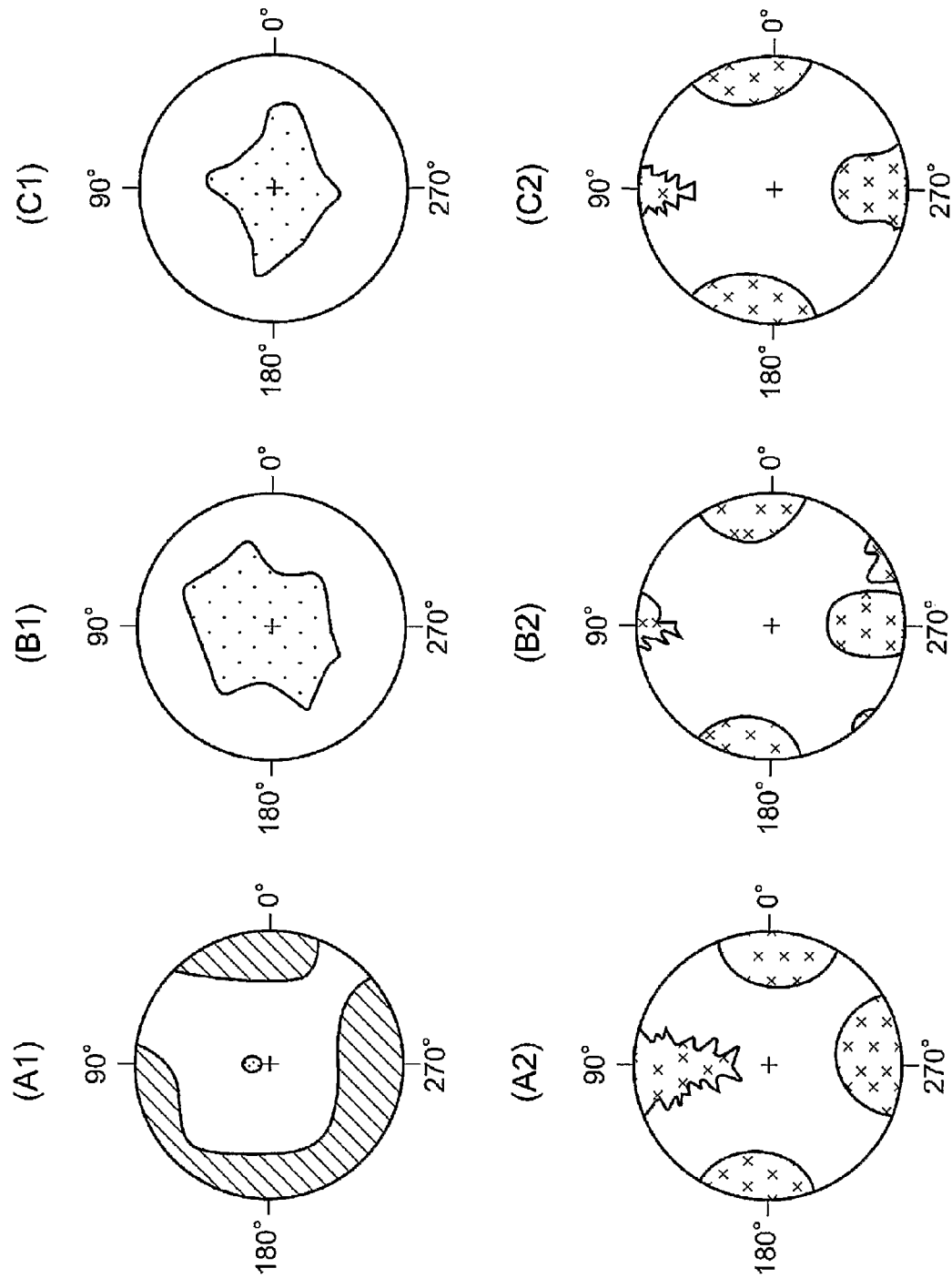

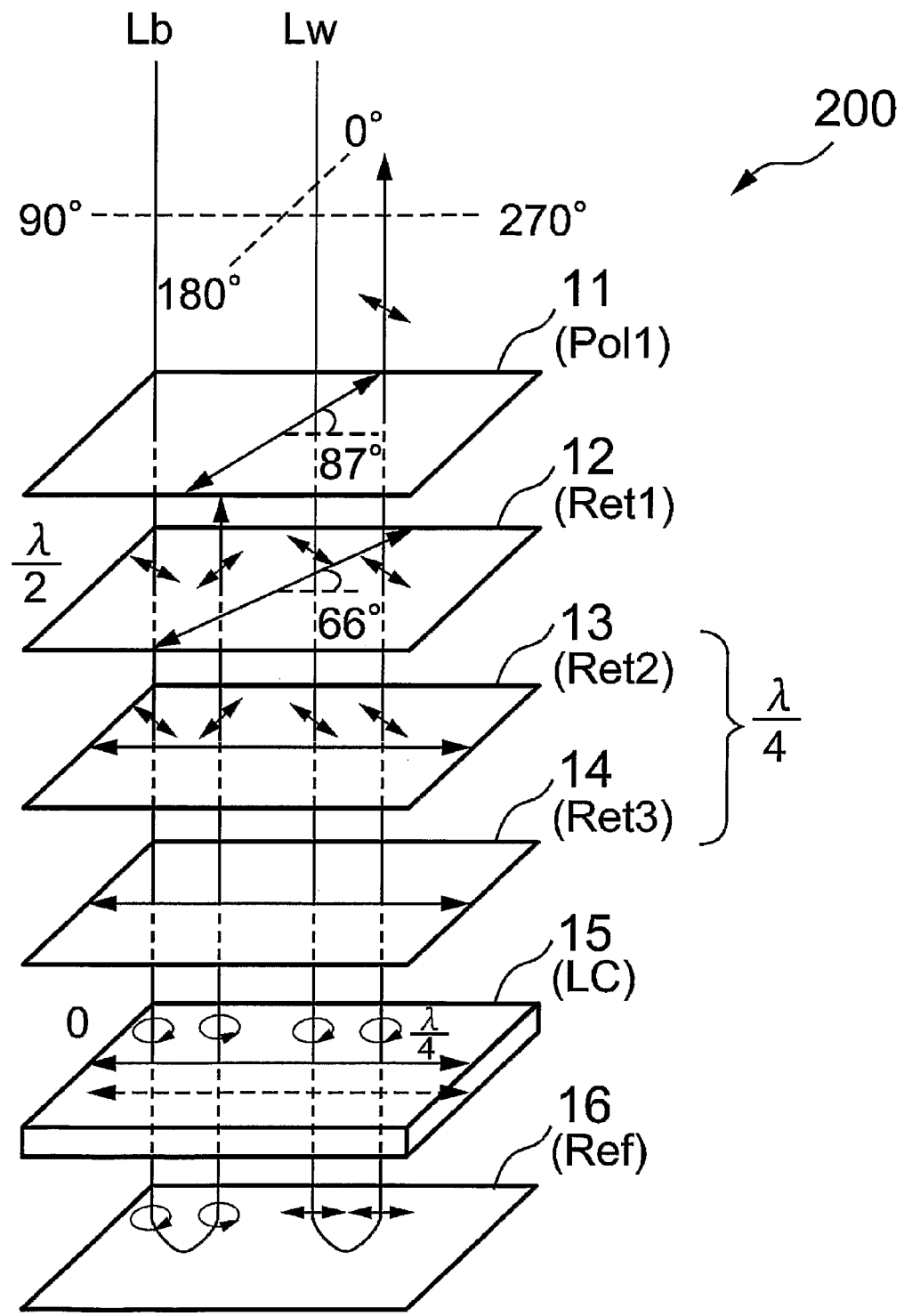
[Fig. 9]

LIQUID CRYSTAL DISPLAY DEVICE HAVING A PARALLEL ALIGNMENT TYPE LIQUID CRYSTAL LAYER

TECHNICAL FIELD

The present invention relates to a liquid crystal display device having a liquid crystal layer of a parallel alignment type.

BACKGROUND ART

There is a proposal on a reflective type liquid crystal display device having a parallel alignment type liquid crystal layer as optical modulation means (e.g., see Patent Document 1).

[Patent Document 1] Japanese Patent Application Laid-Open No. 249126/99 (e.g., paragraphs [0007] to [0013])

The liquid crystal optical element disclosed in this publication is comprised of a parallel alignment type liquid crystal layer, a polarizing plate and a mirror electrode disposed on the front and back sides thereof, respectively, and two kinds of phase difference plates interposed between the parallel alignment type liquid crystal layer and the polarizing plate, and is intended to obtain a bright and high contrast display over a wide viewing angle range in the element and to optimize retardation values of the phase difference plate and the liquid crystal layer.

However, such optimization is also applicable to a structure using a HAN (hybrid aligned nematic) type liquid crystal layer and bend alignment type liquid crystal layer, and so it is not specialized for the structure using a parallel alignment type liquid crystal layer and it is hard to say that it fully exploits advantages of the parallel alignment type liquid crystal layer.

The present inventor has noted that in a parallel alignment type or homogeneous alignment type (hereinafter these will be referred to as 'parallel alignment type') liquid crystal layer, all liquid crystal molecules are basically arranged parallel with upper and lower substrate surfaces sandwiching the liquid crystal layer and in the same direction under a predetermined reference electric field (e.g., no electric field), or in other words the direction of a director of the liquid crystal molecules is substantially parallel with the substrate surface, and therefore it is possible to recognize an average tilt angle of the liquid crystal molecules more accurately and easily than ones of other types. Furthermore, the present inventor has also noted that the parallel alignment type liquid crystal layer does not require additional conditions for alignment control such as a bias voltage which is required for a bend alignment type liquid crystal layer, for example and can adopt a relatively easy alignment control mode. Then, from these viewpoints, the present inventor has come to recognize that just the optimization way specific to the parallel alignment type which exploits such advantages of the parallel alignment type allows a display device using the parallel alignment type liquid crystal layer to obtain a desired viewing angle characteristic most effectively.

Furthermore, while it is desired to take measures for obtaining a desired viewing angle characteristic through an approach different from those described in the above-mentioned Patent Document, there is also an expectation of such optimization in the case where a parallel alignment type liquid crystal layer is applied to a liquid crystal display device other than the reflective type one, such as a recently practically-used, so-called Transflective type liquid crystal display device.

DISCLOSURE OF INVENTION

Technical Problem

The present invention has been made in view of the above-described circumstances and its object is to provide a liquid crystal display device which can make full use of advantages of a parallel alignment type liquid crystal layer and at the same time can obtain a desired viewing angle characteristic.

It is another object of the invention to provide reflective type, transmissive type and Transflective type liquid crystal display devices which can make full use of advantages of the parallel alignment type liquid crystal layer and obtain desired viewing angle characteristics.

Technical Solution

In order to attain the above-mentioned objects, a liquid crystal display device according to one aspect of the present invention is a liquid crystal display device having a configuration wherein a front linearly polarizing plate, a first retardation film, a second retardation film, a third retardation film, a liquid crystal layer, a fourth retardation film, a fifth retardation film, a sixth retardation film and a rear linearly polarizing plate are arranged in this order from a front side thereof, wherein: the liquid crystal layer consists of a liquid crystal material of a parallel alignment type whose birefringent state can be changed in accordance with an electric field applied thereto; the third and fourth retardation films have a negative birefringence and an optic axis that is substantially parallel with a director of liquid crystal molecules of the liquid crystal layer under a condition of no application of electric field; each of the second and fifth retardation films has a slow axis parallel with the director, which consists of a material having a value of Nz being 1 or less, the value being obtained by an equation $Nz=(n_x-n_z)/(n_x-n_y)$, where $n_x$ is a refractive index of the film in a direction of the slow axis, $n_y$ is a refractive index of the film in a fast axis that is perpendicular to the slow axis, and $n_z$ is a refractive index of the film in a direction perpendicular to the slow and fast axes; a sum of a value of retardation of the liquid crystal layer during a dark state and values of retardations of the second to fifth retardation films corresponds to substantially a half of a wavelength of the incident light; and each of the first and sixth retardation films consists of a material whose value of Nz obtained by the equation is 1 or less, and has a retardation corresponding to substantially a half of a wavelength of the incident light.

In this way, it is possible to determine such biaxialities of the first and second retardation, and fifth and sixth retardation films that the possibility that a light component in a polarization state where the light vibrates in a direction parallel with an absorption axis of the front polarizing plate may be appear in a dark state of the display device at a predetermined viewing angle is made to be maximized (or made relatively high), ensuring that light is shielded by the front polarizing plate at the predetermined viewing angle in the dark state and achieving a good black display. Furthermore, the third and fourth retardation films can eliminate deviation of retardation variation with respect to viewing angle variation exhibited by the parallel alignment type liquid crystal layer, and can thereby extend the range of high contrast ratios together with the above-described good black display, which also extending the range of no halftones-reversal and improving the viewing angle characteristic.

In this aspect, an absorption axis of the front linearly polarizing plate, a slow axis of the first retardation film, a slow axis of the sixth retardation film and an absorption axis of the rear linearly polarizing plate may meet the director substantially at angles of 87°, 66°, −66°, 3° on a plan view thereof, respectively, each of the first and sixth retardation films may have an Nz value of substantially 1 and each of the second and fifth retardation films may have an Nz value of substantially 0.6, or an absorption axis of the front linearly polarizing plate, a slow axis of the first retardation film, a slow axis of the sixth retardation film and an absorption axis of the rear linearly polarizing plate may meet the director substantially at angles of 87°, 66°, −66°, 3° on a plan view thereof, respectively, each of the second and fifth retardation films may have an Nz value of substantially 1 and each of the first and sixth retardation films may have an Nz value of substantially 0.3. This makes it possible to attain more exact optimization.

The above-mentioned aspect is intended to realize the configuration or device for performing a transmissive type of liquid crystal displaying, but the present invention is also applicable to a reflective type. In the case of the reflective type, it is provided an aspect in that a liquid crystal display device having a configuration wherein a front linearly polarizing plate, a first retardation film, a second retardation film, a third retardation film, a liquid crystal layer, and an optical reflective layer are arranged in this order from a front side thereof, wherein: the liquid crystal layer consists of a liquid crystal material of a parallel alignment type whose birefringent state can be changed in accordance with an electric field applied thereto; the third retardation film has a negative birefringence and an optic axis that is substantially parallel with a director of liquid crystal molecules of the liquid crystal layer under a condition of no application of electric field; the second retardation film has a slow axis parallel with the director, which consists of a material having a value of Nz being 1 or less, the value being obtained by an equation $Nz=(n_x-n_z)/(n_x-n_y)$, where $n_x$ is a refractive index of the film in a direction of the slow axis, $n_y$ is a refractive index of the film in a fast axis that is perpendicular to the slow axis, and $n_z$ is a refractive index of the film in a direction perpendicular to the slow and fast axes; a sum of a value of retardation of the liquid crystal layer during a dark state and values of retardations of the second and third retardation films corresponds to substantially a quarter of a wavelength of the incident light; and the first retardation film consists of a material whose value of Nz obtained by the equation is 1 or less, and has a retardation corresponding to substantially a half of a wavelength of the incident light.

This aspect can also obtain advantages similar to those of the above-described transmissive type. Furthermore, a Transflective type liquid crystal display device which performs displays in both a transmissive mode and reflective mode has the features of the above-described two aspects.

Likewise, an absorption axis of the front linearly polarizing plate and a slow axis of the first retardation film may meet the director substantially at angles of 87°, 66° on a plan view thereof, respectively, the first retardation film may have an Nz value of substantially 1 and the second retardation film may have an Nz value of substantially 0.6, or an absorption axis of the front linearly polarizing plate and a slow axis of the first retardation film may meet the director substantially at angles of 87°, 66° on a plan view thereof, respectively, the second retardation film may have an Nz value of substantially 1 and the first retardation film may have an Nz value of substantially 0.3, raising expectations for high-level optimization.

DESCRIPTION OF DRAWINGS

FIG. 1 is an illustration in which a general structure of a transmissive liquid crystal display device according to an embodiment of the invention is depicted in perspective;

FIG. 2 is a schematic perspective view of a configuration of a parallel alignment type liquid crystal layer applied to the invention;

FIG. 3 is a graph showing a viewing angle dependence of a retardation of a liquid crystal layer in the liquid crystal display device of FIG. 1;

FIG. 4 is a graph showing a characteristic curve of a viewing angle vs. retardation in the case where the third and forth retardation films are piled up;

FIG. 5 is a graph showing characteristic curves of a viewing angle vs. retardation of a triple-layered construction of the third retardation film, liquid crystal layer and fourth retardation film;

FIG. 6 is a graph showing polarization states of light in a display device in a first case in Poincare sphere;

FIG. 7 is a graph showing polarization states of light in a display device in a second case in Poincare sphere;

FIG. 8 is graphs showing distributions of contrast ratios and distributions of tone reversal areas in a comparison example, an example of FIG. 6 and an example of FIG. 7; and FIG. 9 is an illustration in which a general structure of a reflective liquid crystal display device according to another embodiment of the invention is depicted in perspective.

BEST MODE

With reference now to the drawings, the above-described aspects and other modes of the present invention will be explained in more detail below by way of embodiments.

EMBODIMENT 1

FIG. 1 schematically shows the structure of a liquid crystal display device according to an embodiment of the present invention.

This liquid crystal display device 100 is a transmissive type liquid crystal display device and is comprised of, in the order from the front side that is a display screen side, a linearly polarizing plate (Pol) 11, a first retardation film (Ret1) 12 that is a half-wave ($\lambda/2$) plate, a second retardation film (Ret2) 13, a third retardation film (Ret3) 14, a liquid crystal layer (LC) 15, a fourth retardation film (Ret4) 24, a fifth retardation film (Ret5) 23, a sixth retardation film (Ret6) 22, and a linearly polarizing plate (Pol) 21. The linearly polarizing plate 11 and the first to third retardation films 12 to 14 form means substantially having one of the right circularly polarizing function and left circularly polarizing function, the fourth to sixth retardation films 24 to 22 and linearly polarizing plate 21 form means substantially having the other of the right circularly polarizing function and left circularly polarizing function. A backlight 20 is disposed behind the linearly polarizing plate 21. Here, only main components are shown for simplicity of explanation, but other components may also be practically included in the display device 100.

A biaxial film or uniaxial film having a fixed retardation of substantially a half of a wavelength $\lambda$ of the incident light, that is, a value of $\lambda/2$ is applied to the first and sixth retardation films 12, 22 arranged at the outermost positions with respect to the liquid crystal layer 15. Such incident light is supposed to have a wavelength of approximately 380 nm to 780 nm. A set of the second retardation film 13 and third retardation film 14 and a set of the fourth retardation film 24 and fifth retardation film 23 are supposed to have a retardation of λ/4 as a whole respectively, and a biaxial film or uniaxial film is applied to the second and fifth retardation films 13, 23. A uniaxial film having a negative birefringence is applied to the third and fourth retardation films 14, 24. As will be clarified later, there are cases where the second and fifth retardation films are uniaxial when the first and sixth retardation films are biaxial, where the second and fifth retardation films are biaxial when the first and sixth retardation films are uniaxial, and where all these retardation films are biaxial.

The liquid crystal layer 15 has the parallel alignment type liquid crystal material as described above. More specifically, the liquid crystal layer 15 has molecular order as shown in FIG. 2 and all liquid crystal molecules thereof are basically aligned along a rubbing direction 19 of upper and lower alignment layers 17, 18 which determine the initial alignment of its liquid crystal molecules 15m. In other words, all major axes of (refractive) index ellipsoids of the liquid crystal molecules 15m are arranged parallel with the rubbing direction 19, that is, the director of the liquid crystal molecules 15m is arranged parallel with the rubbing direction 19. Here, the rubbing direction 19 of the alignment layers 17, 18 is assumed to be the direction ((initial) alignment direction) in which the liquid crystal layer 15 is aligned, but it is also possible to adopt other technique to specify the alignment direction than the rubbing. On the liquid crystal layer 15 in FIG. 1, the rubbing directions of the upper and lower alignment layers are represented by a solid arrow and a dotted arrow, respectively.

The slow axes of the second and fifth retardation films 13, 23 and the optic axes of the third and fourth retardation films 14, 24 are set to be parallel with the director of the liquid crystal layer 15. On the other hand, the slow axes of the first and sixth retardation films 12, 22 meet the director at predetermined angles on a plan view and these angles are set to 66°, −66° as acute angles formed in this embodiment. Furthermore, the absorption axes of the polarizing plates 11, 21 meet the director at angles of 87°, 3° respectively.

The second to fifth retardation films 13, 14, 24, 23 and the liquid crystal layer 15 are set to as a whole have a retardation (λ/2) of substantially ½ of a wavelength of the incident light during a black displaying operation (dark state) of the device 100. As described above, the set of the second and third retardation films 13, 14 and the set of the fourth and fifth retardation films 24, 23 each exhibit a retardation of λ/4 as a whole, and therefore the liquid crystal layer 15 is controlled so as to exhibit a retardation equivalent to 0 in a dark state thereof. More specifically, an electric field with a predetermined intensity is applied to the liquid crystal layer 15, and the major axes of the liquid crystal molecules 15m as shown in FIG. 2 are vertically oriented, thereby creating a state with a sufficiently small birefringence.

As shown by a line Lb in FIG. 1, light incident upon the liquid crystal display device 100 from the backlight 20 first passes through the linearly polarizing plate 21 to become linearly polarized light, and then passes through the sixth retardation film 22 to undergo a retardation of λ/2 and become linearly polarized light whose polarization direction is changed to a predetermined direction. Thereafter, the linearly polarized light enters the fifth and fourth retardation films 23, 24 to become rightwise (or leftwise) elliptically polarized light and is led to the liquid crystal layer 15. During a black displaying operation (dark state), the retardation of the liquid crystal layer 15 becomes substantially 0 (however, the retardation is set to approximately 60 nm to realize circularly polarized light in this example) and the elliptically polarized light incident upon the liquid crystal layer 15 is led to the third retardation film 14 with the elliptically polarized light being kept in substantially the same polarization direction. The third and second retardation films 14, 13 transform this elliptically polarized light which has transmitted so far into linearly polarized light in a predetermined polarization direction and this linearly polarized light is led to the front polarizing plate 11 with the polarization direction thereof being further changed by a retardation of λ/2 given by the first retardation film 12. Since the linearly polarizing plate 11 has an absorption axis just parallel with the polarization direction of this linearly polarized light, light entering from the first retardation film 12 is blocked off (absorbed) and prevented from going out of the screen of the device 100 to make black displaying.

On the other hand, during a white displaying operation (bright state), as shown with a line Lw in FIG. 1, the rightwise (or leftwise) elliptically polarized light enters the liquid crystal layer 15 likewise. At this time, however, the liquid crystal layer 15 shows a retardation of λ/2 (approximately 300 nm) and leads elliptically polarized light in a direction reverse to the direction of the elliptically polarized light incident upon the liquid crystal layer 15 to the third retardation film 14. The third and second retardation films 14, 13 transform this elliptically polarized light into linearly polarized light in a polarization direction perpendicular to the polarization direction shown during the black displaying and leads it to the first retardation film 12. This light led to the first retardation film 12 is transformed into linearly polarized light with the polarization direction thereof further changed by the retardation of λ/2 given here and led to the front polarizing plate 11. The polarizing plate 11 has an absorption axis perpendicular to the polarization direction of this linearly polarized light and a transmissive axis parallel therewith, and therefore the light entering from the first retardation film 12 passes through the polarizing plate 11 and goes out of the screen of the device 100 to make white displaying.

In the case of halftone displaying, the liquid crystal layer 15 shows a retardation according to halftone color or brightness to be displayed and leads elliptically polarized light of the corresponding vibration component to the third retardation film 14. This allows the component of the linearly polarized light perpendicular to the absorption axis of the polarizing plate 11 to enter the polarizing plate 11 by an amount corresponding to the color or brightness, then go out of the screen, thus achieving halftone displaying.

This embodiment improves the viewing angle characteristic by not only specifying the above-described optic axes and retardations of the respective layers, etc., but also specifying the structure of the third retardation film 14, liquid crystal layer 15 and/or fourth retardation film 24 and the biaxialities of the first and second retardation films 12, 13 and the fifth and sixth retardation films 23, 22 based on the following considerations.

FIG. 3 is a graph showing a viewing angle dependence of a retardation of the liquid crystal layer 15, in which the horizontal axis shows viewing angles, the vertical axis shows retardation values, and the viewing angle values are represented in the cases where, assuming that a point at which the screen is viewed just from the front along the normal N (see FIG. 1) is 0°, the screen is seen at different viewing angles in the vertical direction of the screen relative to that point. Here, 90° and 270° shown at the top of FIG. 1 indicate the upper and lower orientations of the screen, while 180° and 0° indicate the left and right orientations of the screen. The viewing angle is expressed by an angle x formed by the normal N and a line of sight.

The graph describes characteristic curves of the viewing angle vs. retardation when voltages 4 V, 4.5 V, 5 V are applied to the liquid crystal layer 15 so as to produce a dark state. From this graph, it is understandable that the retardation has a viewing angle dependence asymmetric with respect to the viewing angle 0° and the retardation has large positive values in the negative viewing angle region.

The graph in FIG. 4 shows the same-situational characteristic curve of the viewing angle vs. retardation in the case where the third retardation film 14 and fourth retardation film 24 are piled up. From this graph, it is understandable that the retardation has large negative values in the negative viewing angle region.

Suppose x is a variable of a viewing angle. Then, the retardation of the liquid crystal layer 15 as shown in FIG. 3 can be expressed by a function f(x) and the retardations of the third and fourth retardation films 14, 24 as shown in FIG. 4 can be expressed by functions g1(x), g2(x), respectively. The retardation obtained by the triple-layered construction of these layers and films 14, 15, 24 is expressed by h(x)=f(x)+g1(x)+g2(x) and as shown in FIG. 5. FIG. 5 also shows the representative cases when the voltages 4 V, 4.5 V, 5 V are applied to the liquid crystal layer 15.

At this time, it is preferable to configure the third retardation film 14, liquid crystal layer 15 and/or fourth retardation film 24 so that the retardation h(x1) when the screen is viewed at a positive viewing angle (x1) relative to the normal N of the screen becomes equal to the retardation h(−x1) when the screen is viewed at a negative viewing angle (−x1), that is, h(x1)=h(−x1) is held. Basically, the third and fourth retardation films 14, 24 are constructed so that the characteristic curve in FIG. 3 and the characteristic curve in FIG. 4 have a complementary relationship. In this example, the liquid crystal layer 15 has a deviated characteristic in which retardation has a large positive value in the negative viewing angle region as shown in FIG. 3, and therefore the third and fourth retardation films 14, 24 are constructed so as to have a large negative retardation in the same negative viewing angle region, as shown in FIG. 4, in order to be able to eliminate this deviation. To this end, the third and fourth retardation films 14, 24 have a negative birefringence and have an optic axis substantially parallel with the director of liquid crystal molecules of the liquid crystal layer 15. Furthermore, based of the actual characteristics in FIG. 5, if the applied voltage is set to 4.1V in a dark state of the liquid crystal layer 15, it is possible to make h(x1) equal to h(−x1) more exactly.

Thus, the third and fourth retardation films 14, 24 arranged above and below the liquid crystal layer 15 can make the upper and lower viewing angle characteristics symmetric.

The biaxialities of the first and second retardation films 12, 13 and the fifth and sixth retardation films 23, 22 are optimized by making definition as follows.

FIG. 6 indicates polarization states of light in the display device 100 in Poincare sphere and shows the positions indicating polarization states of light projected onto the S1-S2 plane in the Poincare sphere. The horizontal axis shows a distance from the origin in the S1-axis direction of the Poincare sphere and the vertical axis shows a distance from the origin in the S2-axis direction. Here, the S1-axis indicates the degree of polarization state between the light component vibrating in the lateral direction and the light component vibrating in the longitudinal direction in the Poincare sphere and means that the linearly polarized light component in the lateral or longitudinal vibration direction becomes more dominant as the distance from the origin increases.

The S2-axis is perpendicular to the S1-axis in the Poincare sphere and indicates the degree of a polarization state between the light component diagonally vibrating at an angle of 45° which is just an intermediate angle between the lateral and longitudinal vibration directions and the light component diagonally vibrating at an angle of 135° which is also just an intermediate angle and means that the linearly polarized light component in the diagonal direction becomes more dominant as the distance from the origin increases. The S3-axis is perpendicular to both the S1-axis and S2-axis, indicates the degree of polarization state between the rightwise circularly polarized light component and leftwise circularly polarized light component and means that the component vibrating in the true-circular orbit becomes more dominant as the distance from the origin increases. A single-dot dashed line shown in FIG. 6 indicates the equator of the Poincare sphere, that is, an edge of the circular plane including the S1-axis and S2-axis.

Point p0 on the equator shown in FIG. 6 indicates the position of the polarization state of light vibrating parallel with the absorption axis of the linearly polarizing plate 11. When light in the polarization state corresponding to this point p0 enters the polarizing plate 11, the entire light is blocked off (absorbed) in principle, making it possible to produce the darkest state. Therefore, it is possible to optimize contrast by placing the light incident upon the polarizing plate 11 from the first retardation film 12 in the dark state of the display device 100 at point p0.

In order to approximate the state of light immediately before entering the polarizing plate 11 to point p0, the degrees of biaxialities of the first and second retardation films 12, 13 and the fifth and sixth retardation films 23, 22 are adjusted. As a parameter indicating the degree of biaxiality, an equation $Nz=(n_x-n_z)/(n_x-n_y)$ is used, where $n_x$ is a refractive index in a direction of the slow axis parallel with the principal plane of the film, $n_y$ is a refractive index in a fast axis that is parallel with the principal plane of the film and perpendicular to the slow axis, and $n_z$ is a refractive index in a direction perpendicular to the slow and fast axes.

FIG. 6 shows in dots the state of the incident light on the polarizing plate 11 at a viewing angle of 60°, which is obtained by gradually changing the value of Nz of the second and fifth retardation films 13, 23 from 1 to 0 when the value of Nz of the first and sixth retardation films 12, 22 is 1. It is observed that a change in the polarization state as indicated by a curve arrow is exhibited with such a change of the value of Nz. It is also observed that when the value of Nz of the second and fifth retardation films 13, 23 is approximately 0.6, it comes closest to point p0. Therefore, maximum black displaying is made in a dark state when the value of Nz of the first and sixth retardation films 12, 22 is set to 1 and the value of Nz of the second and fifth retardation films 13, 23 is set to close to 0.6.

On the contrary, FIG. 7 shows in dots the state of the incident light on the polarizing plate 11 at a viewing angle of 60°, which is obtained by gradually changing the value of Nz of the first and sixth retardation films 12, 22 from 1 to 0 when the value of Nz of the second and fifth retardation films 13, 23 is 1. It is observed that a change in the polarization state as indicated by a curve arrow is exhibited with such change of the value of Nz and that when the value of Nz of the first and sixth retardation films 12, 22 is approximately 0.3, it comes closest to point p0. Therefore, maximum black displaying is made in a dark state when the value of Nz of the second and fifth retardation films 13, 23 is set to 1 and the value of Nz of the first and sixth retardation films 12, 22 is set to close to 0.3.

It is noted that the value of Nz being 1 means that the film is uniaxial, and otherwise (Nz≠1), the film is biaxial. Since it comes closer to point p0 when the value of Nz is 1 or less, the value of Nz of the retardation films 13, 23, 12, 22 can be specified as 1 or less. There may be a case where the value of Nz is greater than 1, but the value of Nz should be set to 1 or less in order to approximate the polarization state to point p0 sufficiently. There may also be a case where the value of Nz is 1 or less, but this example does not adopt it because the curve goes away from point p0. Therefore, it is possible to specify 0<Nz≦1. In short, the value of Nz is used to specify the biaxialities of the first and second retardation films and the fifth and sixth retardation films so as to maximize (or make relatively higher) the possibility that the light component in a polarization state in which the light vibrates in a direction parallel with the absorption axis of the polarizing plate 11 may appear in a dark state of the display device 100 at a predetermined viewing angle (here, 60°). For an additional note, any of the first and second retardation films and the fifth and sixth retardation films may be formed to satisfy a condition of biaxiality, that is, Nz<1. In this case, the respective retardation films have an intermediate value that satisfies 0<Nz<1.

FIG. 8 shows the viewing angle characteristics in all directions on the screen, wherein (A1), (B1) and (C1) show their respective distributions of contrast ratios of a comparative example, the above example of FIG. 6 and the above example of FIG. 7, and (A2), (B2) and (C2) show their respective distributions of tone reversal areas of a comparative example, the above example of FIG. 6 and the above example of FIG. 7. For the comparative examples, the structure described in a document "K. Hosaki et al. "Novel Ultra-Thin Hybrid Aligned Nematic Compensators for Wide-Viewing-Angle Transflective TFT-LCDs", SID 03 DIGEST, P-122, pp. 692-695, May 20, 2003" has been used.

All figures show characteristics concerning counterclockwise 360° assuming that the right end of the figure in the horizontal direction is 0°. The graph shows contrast ratios or the degree of tone reversal obtained by moving a line of sight from the center of the circle of the graph which corresponds to a straight view of the screen in directions of all angles using contour lines. That is, if the direction of 0° is assumed to correspond to the right edge in the horizontal direction of the screen, for example, in the case of the direction of 0°, those values are obtained by moving the line of sight from a state in which the screen is viewed from the front to the right side in the horizontal direction of the screen. Values are acquired likewise in other angular directions and the contour lines with the values are obtained from the values acquired in directions of all angles.

In an iso-contrast characteristic graph, the range exhibiting an extremely high contrast ratio (100 or higher) is expressed with dots, while the range exhibiting an extremely low contrast ratio is expressed with shading lines. Furthermore, in a tone reversal characteristic graph, the range in which tone reversal occurs (in the case of 8 levels of halftone) is expressed with x.

As is obvious from these figures, compared to the comparative examples, (B1) and (C1) according to the embodiment exhibit a wide area of high contrast ratios in substantially symmetric shape and (B2) and (C2) show a narrow range of tone reversals.

The left, right, top and bottom in FIG. 8 correspond to left, right, top and bottom of the screen. Therefore, according to the embodiment, when the line of sight is inclined extremely to left, right, up and down of the screen, tone reversal is likely to occur, but it is also possible to rotate the tone reversal areas, for example, in the diagonal direction of the screen by rotating the axes of the respective layers and films as shown in FIG. 1.

EMBODIMENT 2

FIG. 9 schematically illustrates a structure of a liquid crystal display device according to another embodiment of the invention.

This liquid crystal display device 200 is a reflective type liquid crystal display device, parts corresponding to those shown in FIG. 1 are assigned the same reference symbols and detailed descriptions thereof have already been given above and will therefore be omitted.

In this embodiment, a light reflecting layer (Ref) 16 is disposed behind a liquid crystal layer 15 instead of the fourth to sixth retardation films 24 to 22, polarizing plate 21 and backlight 20. The linearly polarizing plate 11 and first to third retardation films 12 to 14 substantially form means provided with a rightwise circularly polarizing or leftwise circularly polarizing function.

As indicated by a line Lb in FIG. 9, external light incident upon the liquid crystal display device 200 passes through the linearly polarizing plate 11 to become linearly polarized light, then passes through the first retardation film 12 to undergo a retardation of $\lambda/2$, and becomes linearly polarized light whose polarization direction is changed in a predetermined direction. Then, such linearly polarized light enters the second and third retardation films 13, 14 to become rightwise (or leftwise) elliptically polarized light and is led to the liquid crystal layer 15. During a black displaying operation (dark state), the retardation of the liquid crystal layer 15 is substantially 0 (however, it is set to approximately 30 nm to realize circularly polarized light in this example), and rightwise (or leftwise) circularly polarized light arrives at the reflecting layer 16 (so far approach route). In the return route, light from the liquid crystal layer 15 is reflected on the reflecting layer 16 where the light becomes leftwise (or rightwise) circularly polarized light in the reversed polarization direction and enters the liquid crystal layer 15. When the light passes through the liquid crystal layer 15 again, the light becomes elliptically polarized light whose polarization direction is reverse to one of the elliptically polarized light having entered the liquid crystal layer 15 in the approach route, and enters the third and second retardation films 14, 13. The third and second retardation films 14, 13 transforms this reflected elliptically polarized light into linearly polarized light in the polarization direction perpendicular to the polarization direction of the linearly polarized light having been incident upon the second retardation film 13 in the approach route. When this linearly polarized light passes through the first retardation film 12, it undergoes a retardation of $\lambda/2$, and is transformed into linearly polarized light in the polarization direction perpendicular to the polarization direction of the linearly polarized light having been incident upon the first retardation film 12 in the approach route and led to the polarizing plate 11. The polarizing plate 11 has an absorption axis just parallel with the polarization direction of this linearly polarized light, and therefore the light entering from the first retardation film 12 is blocked off (absorbed) and prevented from going out of the screen of the device 100, thereby making black displaying.

On the other hand, during a white displaying operation (bright state), as shown by a line Lw in FIG. 1, rightwise (or leftwise) elliptically polarized light likewise enters the liquid crystal layer 15, but the liquid crystal layer 15 produces a retardation of $\lambda/4$ (approximately 150 nm), and so linearly polarized light in a predetermined polarization direction is led to the reflecting layer 16 (so far approach route). In the return route, the reflecting layer 16 reflects this light, but since the light is linearly polarized light, the light returns to the liquid crystal layer 15 as is without changing its polarization direction. The liquid crystal layer 15 transforms through its retardation this reflected linearly polarized light into rightwise (or leftwise) elliptically polarized light in the same direction as the elliptically polarized light having been incident upon the liquid crystal layer in the approach route and leads the light to the third and second retardation films 14, 13. The third and second retardation films 14, 13 transform this reflected light into linearly polarized light in the same polarization direction as the linearly polarized light having been incident upon the film 13 in the approach route and leads the light to the first retardation film 12. The first retardation film 12 also transforms the light to linearly polarized light in the same polarization direction as that of the linearly polarized light having been incident upon the film 12 in the approach route and returns the light to the linearly polarizing plate 11. The polarizing plate 11 has an absorption axis perpendicular to the polarization direction of this linearly polarized light and a transmissive axis parallel therewith, and therefore the light entering from the first retardation film 12 is allowed to pass therethrough and go out of the screen of the device 100, thus making white displaying.

In the case of halftone displaying, the liquid crystal layer 15 has a retardation corresponding to the halftone color or brightness to be displayed and returns elliptically polarized light with the corresponding vibration component to the third retardation film 14. This allows the linearly polarized light component perpendicular to the absorption axis of the polarizing plate 11 to enter the polarizing plate 11 by an amount corresponding to the color or brightness and go out of the screen, thus achieving halftone displaying.

Similarly to the above, this embodiment also improves the viewing angle characteristics by specifying the structure of the third retardation film 14 and liquid crystal layer 15 and biaxialities of the first and second retardation films 12, 13. That is, the function of the fourth retardation film 24 in the foregoing embodiment is assumed by the third retardation film 14 in the return route of light in this embodiment, and therefore it is possible to apply a form of two third retardation films 14 piled up to the consideration in FIGS. 4 and 5 and accordingly to set the viewing angle dependence of retardation of the film and the value of a voltage applied to the liquid crystal layer 15 during black displaying. Furthermore, the function of the fifth and sixth retardation films 23, 22 in the foregoing embodiment is assumed by the second and first retardation films 13, 12 in the return route of light in this embodiment, and therefore much the same effects can be obtained if the most effective value of Nz is selected in a dark state by applying the value of Nz of the second retardation film 13 when the value of Nz of the first retardation film 12 is set to 1 to the consideration in FIG. 6, or by applying the value of Nz of the first retardation film 12 when the value of Nz of the second retardation film 13 is set to 1 to the consideration in FIG. 7.

Since the handled light has the approach and return routes and passes through the liquid crystal layer 15 twice, retardation of the liquid crystal layer 15 is a half of that of a transmissive type display device. For the same reason, the sum of a value of retardation of the liquid crystal layer 15 during a dark state and values of retardations of the second and third retardation films is a half of the sum of a value of retardation of the liquid crystal layer 15 in a transmissive type display device during a dark state and values of retardations of the second to fifth retardation films.

The transmissive type and reflective type liquid crystal display devices have been explained so far, but the present invention is also applicable to a so-called transflective type liquid crystal display device. That is, it is basically the structure of the transmissive type liquid crystal display device 100 provided with a light reflecting layer partially interposed between the liquid crystal layer 15 and the fourth retardation film 24. Furthermore, the light reflecting layer in this case can be designed in such a way that reflective areas are formed in their respective pixels and other areas constitute transmissive areas. Furthermore, the light reflecting layer 31 may be formed so as to also serve as pixel electrodes. The structure of such a light reflecting layer of the transflective type liquid crystal display device can be referred to in a document "M. Kubo, et al. "Development of Advanced TFT with Good Legibility under Any Intensity of Ambient Light", IDW' 99, Proceedings of The Sixth International Display Workshops, AMD3-4, page 183-186, Dec. 1, 1999, sponsored by ITE and SID", etc.

In this case, light behaves in the reflective areas as explained in FIG. 9, whereas light behaves in the transmissive areas as explained in FIG. 1, and so effects similar to those described above can be expected in both reflective and transmissive modes.

The transmissive type display device shown in FIG. 1 has been explained assuming that the polarizing plate 21 and the fourth to sixth retardation films 24 to 22 form rightwise circularly polarizing means, but these may also be modified so as to form leftwise circularly polarizing means. In this case, the polarizing plate 11 and the first to third retardation films 12 to 14 will form leftwise circularly polarizing means. That is, in the one and other circularly polarizing means that sandwich the liquid crystal layer 15 from above and below, if the one plays the role of rightwise circular polarization, the other plays the role of leftwise circular polarization.

The embodiments of the present invention have been explained so far, but it goes without saying that the present invention may be modified in various ways and may also be implemented by adding additional components to the liquid crystal display device. Furthermore, the technical features specific to the present invention have been expressed using terms including "slow axis", "fast axis", "director", "alignment direction", "perpendicular", "parallel", etc., but those features can also be expressed using other terms, and therefore it should be noted that the present invention is directed to technical particulars truly meant by these terms.

Furthermore, the present invention is not necessarily limited to the above-described embodiments and it goes without saying that those skilled in the art can derive various modifications without departing from the spirit described in the claims.

LIST OF REFERENCE NUMERALS

100 . . . transmissive type liquid crystal display device
11 . . . linearly polarizing plate
12 . . . first retardation film
13 . . . second retardation film
14 . . . third retardation film
15 . . . liquid crystal layer
20 . . . backlight
21 . . . linearly polarizing plate
22 . . . sixth retardation film
23 . . . fifth retardation film
24 . . . fourth retardation film
15m . . . liquid crystal molecule
17, 18 . . . alignment layer 19 . . . rubbing direction
200 . . . reflective type liquid crystal display device
16 . . . optical reflective layer

The invention claimed is:

1. A liquid crystal display device having a configuration wherein a front linearly polarizing plate, a first retardation film, a second retardation film, a third retardation film, a liquid crystal layer, a fourth retardation film, a fifth retardation film, a sixth retardation film and a rear linearly polarizing plate are arranged in this order from a front side thereof, wherein:

the liquid crystal layer consists of a liquid crystal material of a parallel alignment type whose birefringent state can be changed in accordance with an electric field applied thereto;

the third and fourth retardation films have a negative birefringence and an optic axis that is substantially parallel with a director of liquid crystal molecules of the liquid crystal layer under a condition of no application of electric field; each of the second and fifth retardation films has a slow axis parallel with the director, which consists of a material having a value of Nz being 1 or less, the value being obtained by an equation $Nz=(n_x-n_z)/(n_x-n_y)$, where $n_x$ is a refractive index of the film in a direction of the slow axis, $n_y$ is a refractive index of the film in a fast axis that is perpendicular to the slow axis, and $n_z$ is a refractive index of the film in a direction perpendicular to the slow and fast axes;

a sum of a value of retardation of the liquid crystal layer during a dark state and values of retardations of the second to fifth retardation films corresponds to substantially a half of a wavelength of the incident light; and each of the first and sixth retardation films consists of a material whose value of Nz obtained by the equation is 1 or less, and has a retardation corresponding to substantially a half of a wavelength of the incident light.

2. A liquid crystal display device as defined in claim 1, wherein: an absorption axis of the front linearly polarizing plate, a slow axis of the first retardation film, a slow axis of the sixth retardation film and an absorption axis of the rear linearly polarizing plate meet the director substantially at angles of 87°, 66°, −66°, 3° on a plan view thereof, respectively; each of the first and sixth retardation films has an Nz value of substantially 1; and each of the second and fifth retardation films has an Nz value of substantially 0.6.

3. A liquid crystal display device as defined in claim 1, wherein: an absorption axis of the front linearly polarizing plate, a slow axis of the first retardation film, a slow axis of the sixth retardation film and an absorption axis of the rear linearly polarizing plate meet the director substantially at angles of 87°, 66°, −66°, 3° on a plan view thereof, respectively; each of the second and fifth retardation films has an Nz value of substantially 1; and each of the first and sixth retardation films has an Nz value of substantially 0.3.

4. A liquid crystal display device having a configuration wherein a front linearly polarizing plate, a first retardation film, a second retardation film, a third retardation film, a liquid crystal layer, and an optical reflective layer are arranged in this order from a front side thereof, wherein: the liquid crystal layer consists of a liquid crystal material of a parallel alignment type whose birefringent state can be changed in accordance with an electric field applied thereto; the third retardation film has a negative birefringence and an optic axis that is substantially parallel with a director of liquid crystal molecules of the liquid crystal layer under a condition of no application of electric field; the second retardation film has a slow axis parallel with the director, which consists of a material having a value of Nz being 1 or less, the value being obtained by an equation $Nz=(n_x-n_z)/(n_x-n_y)$ where $n_x$ is a refractive index of the film in a direction of the slow axis, $n_y$ is a refractive index of the film in a fast axis that is perpendicular to the slow axis, and $n_z$ is a refractive index of the film in a direction perpendicular to the slow and fast axes; a sum of a value of retardation of the liquid crystal layer during a dark state and values of retardations of the second and third retardation films corresponds to substantially a quarter of a wavelength of the incident light; and the first retardation film consists of a material whose value of Nz obtained by the equation is 1 or less, and has a retardation corresponding to substantially a half of a wavelength of the incident light.

5. A liquid crystal display device as defined in claim 4, wherein: an absorption axis of the front linearly polarizing plate and a slow axis of the first retardation film meet the director substantially at angles of 87°, 66° on a plan view thereof, respectively; the first retardation film has an Nz value of substantially 1; and the second retardation film has an Nz value of substantially 0.6.

6. A liquid crystal display device as defined in claim 4, wherein: an absorption axis of the front linearly polarizing plate and a slow axis of the first retardation film meet the director substantially at angles of 87°, 66° on a plan view thereof, respectively; the second retardation film has an Nz value of substantially 1; and the first retardation film has an Nz value of substantially 0.3.

* * * * *